US008822056B2

United States Patent
Brewer et al.

(10) Patent No.: US 8,822,056 B2
(45) Date of Patent: Sep. 2, 2014

(54) METHODS AND SYSTEMS FOR SUPPORTING A BATTERY

(75) Inventors: William W. Brewer, Cuyahoga Falls, OH (US); David M. Edwards, Marysville, OH (US); Andrew W. Fields, Radnor, OH (US); Alexander R. Hutter, Plain City, OH (US); Patrick Joseph Ellison, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 85 days.

(21) Appl. No.: 13/483,233

(22) Filed: May 30, 2012

(65) Prior Publication Data
US 2013/0323561 A1 Dec. 5, 2013

(51) Int. Cl.
*H01M 2/10* (2006.01)
*B60R 16/04* (2006.01)

(52) U.S. Cl.
USPC .............................. 429/100; 429/96; 180/68.5

(58) Field of Classification Search
CPC ....... H01M 2/10; H01M 2/1083; B60R 16/04
USPC .................................. 429/96–100; 180/68.5
See application file for complete search history.

(56) References Cited

U.S. PATENT DOCUMENTS

| | | | | |
|---|---|---|---|---|
| 4,573,588 | A | * | 3/1986 | Cohen ........................ 211/41.12 |
| 5,086,860 | A | * | 2/1992 | Francis et al. ................ 180/68.5 |
| 5,547,036 | A | * | 8/1996 | Gawaskar et al. ........... 180/68.5 |
| 5,636,701 | A | | 6/1997 | Norman et al. |
| 6,040,080 | A | | 3/2000 | Minami et al. |
| 6,102,356 | A | | 8/2000 | Huntley et al. |
| 6,439,329 | B1 | | 8/2002 | Vaishnav et al. |
| 7,026,377 | B1 | | 4/2006 | Grant |
| 7,469,763 | B2 | | 12/2008 | Dupuis et al. |
| 7,610,978 | B2 | | 11/2009 | Takasaki et al. |
| 7,632,445 | B2 | | 12/2009 | Porter et al. |
| 7,836,989 | B2 | | 11/2010 | Reed et al. |
| 7,836,990 | B2 | | 11/2010 | Reed et al. |
| 2005/0224683 | A1 | | 10/2005 | Hirayu |
| 2007/0017720 | A1 | | 1/2007 | Fujii et al. |
| 2009/0325049 | A1 | | 12/2009 | Niedzwiecki et al. |
| 2011/0036654 | A1 | | 2/2011 | Rinderlin et al. |
| 2012/0018237 | A1 | | 1/2012 | Kovach et al. |

FOREIGN PATENT DOCUMENTS

JP          2002029336 A    *    1/2002

OTHER PUBLICATIONS

Battery Storage; http://www.noco-usa.com/pdf/Noco-Catalog_Battery-Storage.pdf; Jul. 27, 2011; pp. 30-43.
DIY Replacement Battery Tray—Quick and Dirty Install; http://www.grobe.us/Jeep/Tech/Electrical/BatteryTray/qnd-install.htm; Jul. 27, 2011; 2 pages.
Installation Instructions for Volkswagen Golf; http://www.aemintakes.com/AEM-21-494_inst.pdf; 2004; pp. 1-9.
ISA Search Report for related application PCT/US2013/043128 dated Oct. 4, 2013.

* cited by examiner

*Primary Examiner* — Gregg Cantelmo
(74) *Attorney, Agent, or Firm* — Armstrong Teasdale LLP

(57) ABSTRACT

A battery support includes a base having an upper surface and a lower surface, a spine extending downwardly from and axially along the base such that at least a portion of the base is cantilevered from the spine, and at least one rib extending downwardly from the base and laterally from the spine. The upper surface is sized to support a battery thereon.

11 Claims, 5 Drawing Sheets

METHODS AND SYSTEMS FOR SUPPORTING A BATTERY

BACKGROUND

The present disclosure relates generally to vehicle components and, more particularly, to methods and systems for use in supporting a battery in a vehicle environment.

At least some known battery supports are fabricated primarily from sheet metal. As a result, known battery support configurations are limited to sheet metal-forming restrictions. As such, known battery supports fabricated from sheet metal generally have simple configurations and are locally reinforced using stamped-metal parts that are welded and/or coupled to the supports. Although the stamped-metal parts may increase an overall strength and/or durability of the battery support, such parts also increase the overall weight of the battery support, which may negatively impact the operational performance of a vehicle.

BRIEF DESCRIPTION

In one aspect, a method is provided for use in supporting a battery. The method includes coupling a spine to a rail along an axial direction. The spine extends downwardly from a base along the axial direction such that at least a portion of the base is cantilevered from the spine. At least one rib extends downwardly from the base and laterally from the spine. A battery is positioned on an upper surface of the base.

In another aspect, a battery support is provided. The battery support includes a base having an upper surface and a lower surface, a spine extending downwardly from and axially along the base such that at least a portion of the base is cantilevered from the spine, and at least one rib extending downwardly from the base and laterally from the spine. The upper surface is sized to support a battery thereon.

In yet another aspect, a system is provided. The system includes a rail extending in an axial direction, and a battery support including a base having an upper surface and a lower surface. A spine extends downwardly from the base along the axial direction such that at least a portion of the base is cantilevered from the spine. At least one rib extends downwardly from the base and laterally from the spine. The spine is coupled to the rail along the axial direction. A battery is positioned on the upper surface of the base.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The subject matter described herein relates generally to vehicle components and, more particularly, to methods and systems for use in supporting a battery. In one embodiment, a battery support is a molded, metal insert-free, open structure that includes a base having an upper surface and a lower surface. The upper surface is sized to support a battery thereon. A spine extends downwardly from the base such that at least a portion of the base is cantilevered from the spine. At least one rib extends downwardly from the base and from the spine to provide vertical support to the base.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
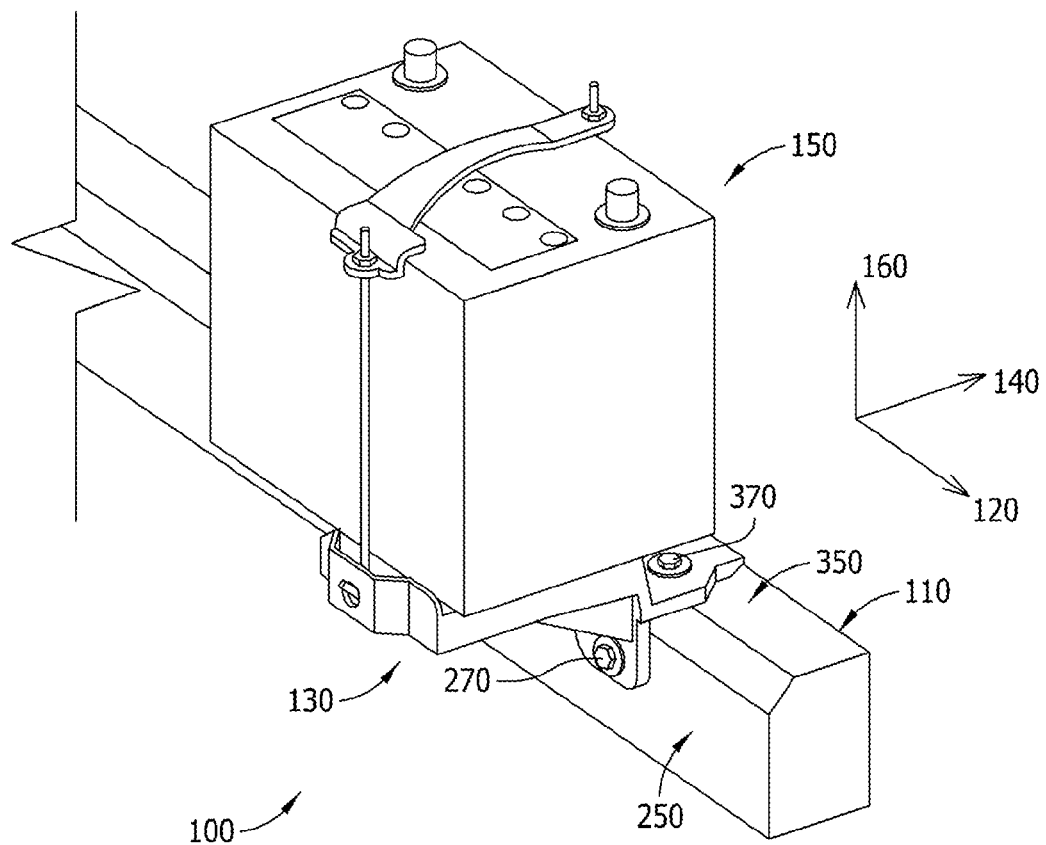
FIG. 1 is a perspective view of an exemplary battery support system.

FIG. 1 is a perspective view of an exemplary battery support system 100. In the exemplary embodiment, battery support system 100 includes a rail 110 that extends generally along an X-axis 120 (i.e., axially). In the exemplary embodiment, a battery support 130 is coupled to rail 110. More specifically, in the exemplary embodiment, battery support 130 extends outwardly from rail 110 generally along a Y-axis 140 that is substantially perpendicular to the X-axis 120 (i.e., laterally) such that battery support 130 is maintained in a cantilevered configuration. In the exemplary embodiment, a battery 150 is positioned on top of battery support 130 such that battery 150 induces a downward load generally along a Z-axis 160 that is substantially perpendicular to the X-axis 120 and/or the Y-axis 140 (i.e., vertically).

Figure 2:
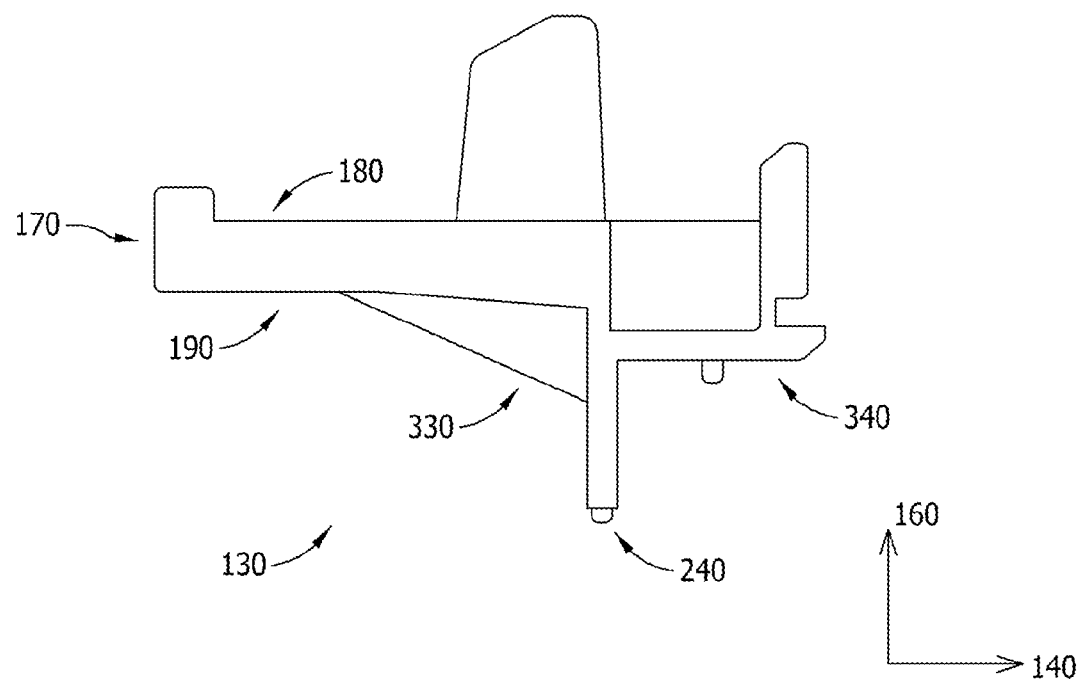
FIG. 2 is an end view of an exemplary battery support that may be used in the support system shown in FIG. 1.
Figure 3:
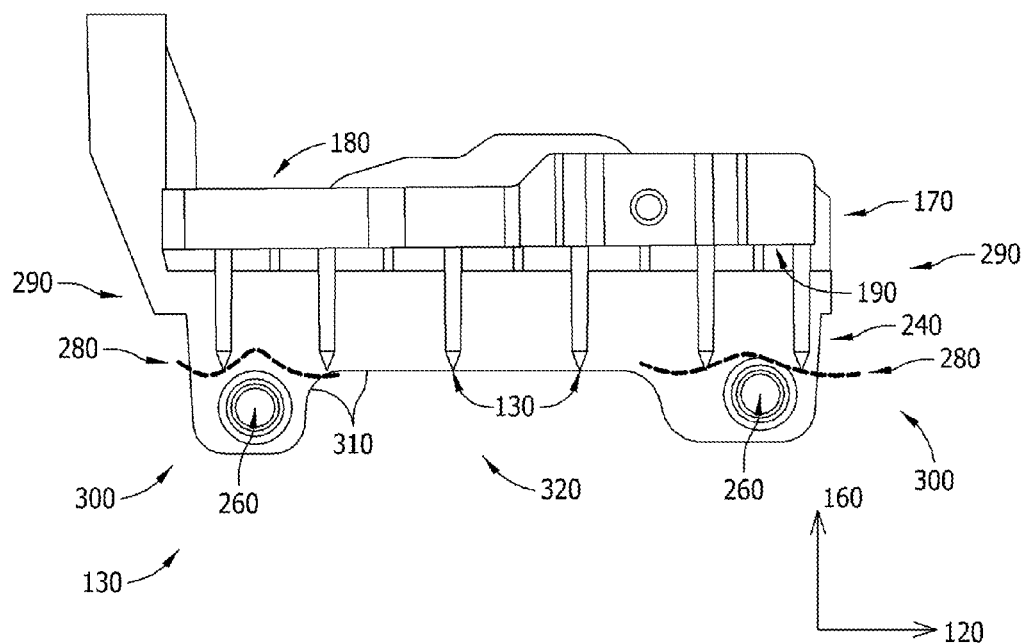
FIG. 3 is a side view of the battery support shown in FIG. 2.
Figure 4:
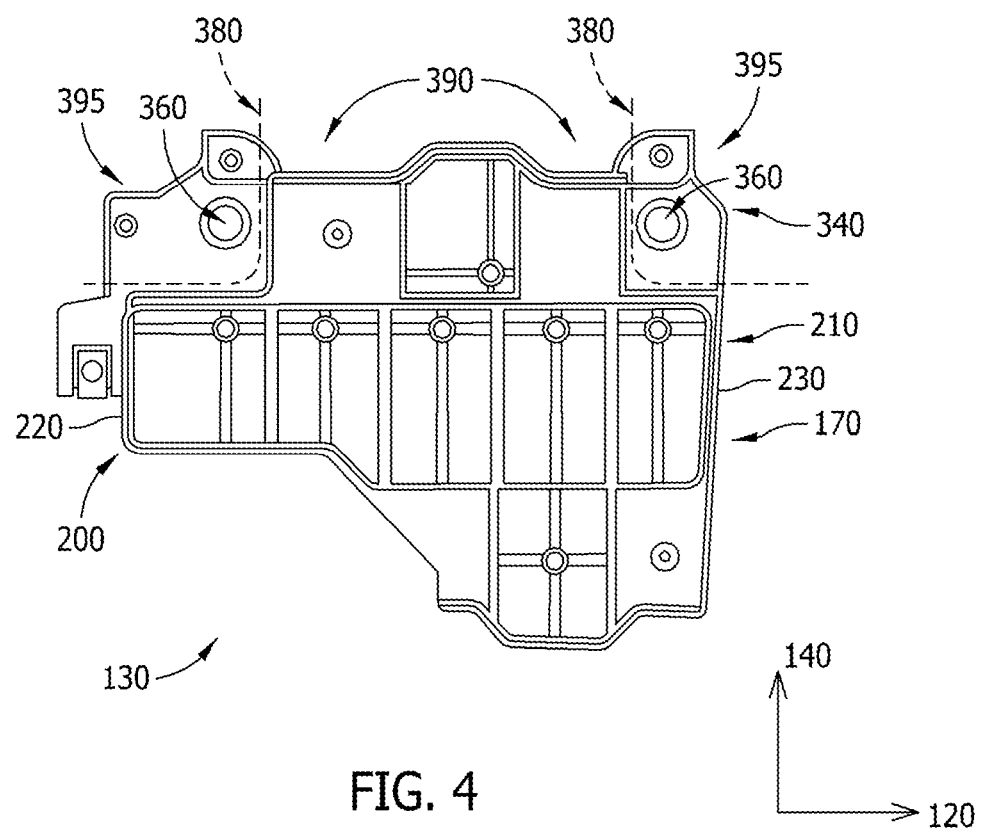
FIG. 4 is a top view of the battery support shown in FIG. 2.

FIG. 2 is an end view (i.e., shows the Y-Z plane) of battery support 130. FIG. 3 is a side view (i.e., shows the X-Z plane) of battery support 130. FIG. 4 is a top view (i.e., shows the X-Y plane) of battery support 130. In the exemplary embodiment, battery support 130 includes a base 170 having an upper surface 180 (shown in FIGS. 2 and 3) and a lower surface 190 (shown in FIGS. 2 and 3). In the exemplary embodiment, upper surface 180 and/or lower surface 190 are oriented generally within the X-Y plane. Moreover, in the exemplary embodiment, upper surface 180 is sized and/or configured to receive and/or support at least a portion of battery 150. Alternatively, upper surface 180 and/or lower surface 190 may have any size, shape, and/or orientation that enables battery support 130 to function as described herein.

In the exemplary embodiment, base 170 includes a first outer edge portion 200 (shown in FIG. 4) and a second outer edge portion 210 (shown in FIG. 4) that each extend generally laterally. In the exemplary embodiment, first edge portion 200 and second edge portion 210 are spaced apart generally axially. Moreover, in the exemplary embodiment, base 170 includes a first wall 220 (shown in FIG. 4) and a second wall 230 (shown in FIG. 4) that extend within the Y-Z plane. More specifically, in the exemplary embodiment, first wall 220 extends generally upwardly from first outer edge portion 200, and second wall 230 extends generally upwardly from second outer edge portion 210. Accordingly, in the exemplary embodiment, first wall 220 and second wall 230 are spaced apart generally axially. Alternatively, first wall 220 and/or second wall 230 may be aligned in any orientation that enables battery support 130 to function as described herein.

In the exemplary embodiment, a spine 240 (shown in FIGS. 2 and 3) extends generally within the X-Z plane. More specifically, in the exemplary embodiment, spine 240 extends generally downwardly from lower surface 190 and is positioned such that at least a portion of base 170 is cantilevered from spine 240 and/or rail 110. In the exemplary embodiment, spine 240 is coupled to a side face 250 (shown in FIG. 1) of rail 110, generally along the X-axis 120. More specifically, in the exemplary embodiment, spine 240 includes a plurality of openings 260 (shown in FIG. 3) that extend generally laterally therethrough. In the exemplary embodiment, each opening 260 is sized, shaped, and/or oriented to receive a respective coupling mechanism 270 (shown in FIG. 1) therethrough for use in coupling battery support 130 to rail 110. Accordingly, in the exemplary embodiment, coupling mechanism 270 facilitates maintaining a relative lateral position of battery support 130. In the exemplary embodiment, coupling mechanism 270 is a bolt. Alternatively, any coupling mechanism 270 may be used that enables battery support 130 to function as described herein.

In the exemplary embodiment, spine 240 includes at least one mechanism that enables spine 240 to "fail" generally in the X-axis 120. More specifically, in the exemplary embodiment, spine 240 is configured and/or designed to address axial loading issues. For example, in the exemplary embodiment, spine 240 includes at least one line of weakness 280 (shown in FIG. 3) that extends generally axially between openings 260 and base 170. Accordingly, in the exemplary embodiment, base 170 is positioned on a first side 290 (shown in FIG. 3) of line of weakness 280, and openings 260 are positioned on an opposite second side 300 (shown in FIG. 3) of line of weakness 280. In the exemplary embodiment, spine 240 is pre-configured to divide along line of weakness 280 such that first side 290 separates from second side 300 when battery support 130 sustains an axial load that is greater than a predetermined threshold. Moreover, in the exemplary embodiment, spine 240 includes at least one outer edge 310 (shown in FIG. 3) that at least partially defines a recess 320 (shown in FIG. 3) positioned on second side 300, generally between openings 260. Accordingly, in the exemplary embodiment, the size and/or relative positioning of recess 320 facilitates decreasing a size and/or length of line of weakness 280. Alternatively, line of weakness 280 and/or recess 320 may have any size, shape, and/or length that enables spine 240 to function as described herein.

In the exemplary embodiment, at least one rib 330 (shown in FIGS. 2 and 3) extends generally within the Y-Z plane. More specifically, in the exemplary embodiment, rib 330 extends generally downwardly from lower surface 190 and is positioned to provide vertical support to base 170. In the exemplary embodiment, rib 330 extends generally laterally from spine 240 generally in the same direction as the cantilevered portion of base 170. In the exemplary embodiment, rib 330 is substantially positioned between first wall 220 and second wall 230. More specifically, in the exemplary embodiment, rib 330 is substantially parallel to first wall 220 and/or second wall 230. Alternatively, rib 330 may be aligned in any orientation that enables battery support 130 to function as described herein.

In the exemplary embodiment, at least one flange 340 (shown in FIGS. 2 and 4) extends generally within the X-Y plane. More specifically, in the exemplary embodiment, flange 340 extends generally laterally from spine 240 in a direction opposite rib 330 and/or the cantilevered portion of base 170. In the exemplary embodiment, flange 340 is coupled to an upper face 350 (shown in FIG. 1) of rail 110 generally along the X-axis 120. More specifically, in the exemplary embodiment, flange 340 includes at least one opening 360 (shown in FIG. 4) extending generally vertically therethrough. In the exemplary embodiment, each opening 360 is sized, shaped, and/or oriented to receive a respective coupling mechanism 370 (shown in FIG. 1) therethrough for use in coupling battery support 130 to rail 110. Accordingly, in the exemplary embodiment, coupling mechanism 370 facilitates maintaining a relative vertical position of battery support 130. In the exemplary embodiment, coupling mechanism 370 is a bolt. Alternatively, any coupling mechanism 370 may be used that enables battery support 130 to function as described herein.

In the exemplary embodiment, flange 340 includes at least one mechanism that enables flange 340 to "fail" generally in the X-axis 120. More specifically, in the exemplary embodiment, flange 340 is configured and/or designed to address axial loading issues. For example, in the exemplary embodiment, flange 340 includes at least one line of weakness 380 (shown in FIG. 4) that extends between openings 360 and base 170. Accordingly, in the exemplary embodiment, base 170 is positioned on a first side 390 (shown in FIG. 4) of line of weakness 380, and openings 360 are positioned on an opposite second side 395 (shown in FIG. 4) of line of weakness 380. In the exemplary embodiment, flange 340 is pre-configured to divide along line of weakness 380 such that first side 390 separates from second side 395 when battery support 130 sustains an axial load that is greater than a predetermined threshold. Alternatively, line of weakness 380 may have any size, shape, and/or length that enables flange 340 to function as described herein.

Figure 5:
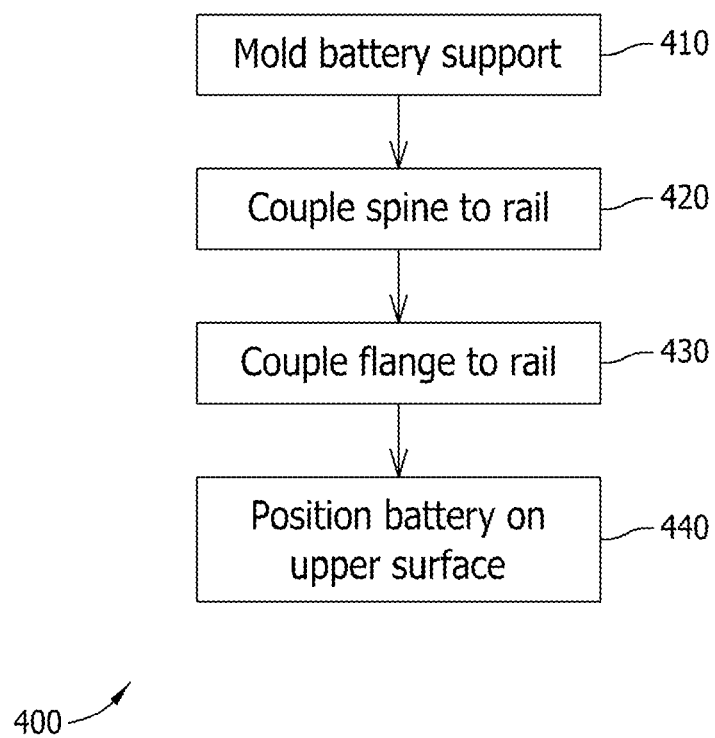
FIG. 5 is a flow chart of an exemplary method that may be used to fabricate the battery support shown in FIG. 2.

FIG. 5 is a flow chart of an exemplary method 400 that may be used to fabricate battery support 130. In the exemplary embodiment, battery support 130 may be molded 410 from at least a fiber-reinforced thermoplastic material. More specifically, in the exemplary embodiment, battery support 130 is molded 410 to include spine 240 that extends generally downwardly from base 170 along the X-axis 120 such that at least a portion of base 170 is cantilevered from spine 240. Moreover, in the exemplary embodiment, battery support 130 is molded 410 to include at least one rib 330 that extends generally downwardly from base 170 and generally laterally from spine 240. In the exemplary embodiment, the cantilevered portion of base 170 and rib 330 extend generally laterally from spine 240 in the same general direction. In the exemplary embodiment, battery support is molded 410 such that rib 330 is positioned generally between first wall 220 and second wall 230. Furthermore, in the exemplary embodiment, battery support is molded 410 to include line of weakness 280 such that base 170 is positioned on first side 290, and openings 260 are positioned on second side 300.

In the exemplary embodiment, spine 240 is coupled 420 to rail 110 generally along the X-axis 120. More specifically, in the exemplary embodiment, a respective coupling mechanism 270 is received within each opening 260 to facilitate coupling 420 spine 240 to rail 110. In the exemplary embodiment, battery support 130 is molded 410 such that recess 320 is positioned generally between coupling mechanisms 270 and/or openings 260. More specifically, in the exemplary embodiment, a first portion of spine 240 is coupled 420 to rail 110, and a second portion of spine 240 is coupled 420 to rail 110 such that recess 320 is positioned generally between the first portion and the second portion.

Moreover, in the exemplary embodiment, flange 340 is coupled 430 to rail 110 generally along the X-axis 120. More specifically, in the exemplary embodiment, a respective coupling mechanism 370 is received within each opening 360 to facilitate coupling 430 flange 340 to rail 110. In the exemplary embodiment, battery support 130 is molded 410 such that flange 340 extends generally laterally from spine 240 in a direction opposite rib 330 and/or the cantilevered portion of base 170.

In the exemplary embodiment, battery 150 is positioned 440 on upper surface 180. Accordingly, in the exemplary embodiment, battery 150 is supported by battery support 130 in an automobile environment.

The subject matter described herein enables a battery to be supported within an automobile in a unique manner. More specifically, the battery support described herein is a molded, open structure that is lightweight relative to at least some conventional battery supports of a similar size while maintaining a strength, durability, and/or robustness sufficient to support a battery in an automobile environment. Moreover, the battery support described herein is configured to have more vertical and lateral strength, durability, and/or robustness relative to at least some conventional battery supports.

Exemplary embodiments of methods and systems for supporting a battery are described above in detail. The systems and methods are not limited to the specific embodiments described herein, but rather, components of systems and/or steps of the method may be utilized independently and separately from other components and/or steps described herein. Each component and each method step may also be used in combination with other components and/or method steps. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of supporting a battery, said method comprising:
   coupling a spine to a rail generally along an axial direction, wherein the spine extends generally axially downwardly from a base such that at least a portion of the base is cantilevered from the spine, the base is positioned on a first side of a line of weakness, and an opening extending through the spine is positioned on a second side of a line of weakness that is opposite the first side, and wherein at least one rib extends generally downwardly from the base and generally laterally from the spine; and
   positioning a battery on an upper surface of the base such that the battery is supported by the base.

2. A method in accordance with claim 1, wherein coupling a spine further comprises coupling the spine to the rail such that the cantilevered portion of the base and the at least one rib extend generally laterally from the spine generally in the same direction.

3. A method in accordance with claim 1, wherein coupling a spine further comprises coupling the spine to the rail such that the at least one rib is positioned generally between a first wall extending from a first outer edge portion of the base and a second wall extending from a second outer edge portion of the base that is opposite the first outer edge portion.

4. A method in accordance with claim 1 further comprising coupling a flange to the rail generally along the axial direction such that the flange extends generally laterally from the spine in a first direction, and such that the at least one rib extends generally laterally from the spine in a second direction that is opposite the first direction.

5. A method in accordance with claim 1, wherein coupling the spine further comprises:
   coupling a first portion of the spine to the rail; and
   coupling a second portion of the spine to the rail such that the spine includes an outer edge that defines a recess positioned generally between the first portion and the second portion.

6. A system comprising:
   a rail extending in an axial direction;
   a battery support comprising a base having an upper surface and a lower surface, a spine extending generally axially downwardly from the base such that at least a portion of the base is cantilevered from the spine, and at least one rib extending generally downwardly from the base and generally laterally from the spine, wherein the spine is coupled to the rail generally along the axial direction, the spine comprises a line of weakness, the base is positioned on a first side of the line of weakness, and an opening extending through the spine is positioned on a second side of the line of weakness that is opposite the first side; and
   a battery positioned on the upper surface of the base.

7. A system in accordance with claim 6, wherein the cantilevered portion of the base and the at least one rib extend generally laterally from the spine in the same general direction.

8. A system in accordance with claim 6, wherein the base comprises a first wall extending from a first outer edge portion of the base, and a second wall extending from a second outer edge portion of the base that is opposite the first outer edge portion, wherein the at least one rib is positioned generally between the first wall and the second wall.

9. A system in accordance with claim 6, wherein the at least one rib is substantially parallel to at least one of the first wall and the second wall.

10. A system in accordance with claim 6 further comprising a flange extending generally laterally from the spine in a first direction, the flange coupled to the rail generally along the axial direction, wherein the at least one rib extends generally laterally from the spine in a second direction that is opposite the first direction.

11. A system in accordance with claim 6, wherein the spine comprises an outer edge that defines a recess.

* * * * *